(12) United States Patent
Bender et al.

(10) Patent No.: US 7,105,774 B2
(45) Date of Patent: *Sep. 12, 2006

(54) INTEGRATED ENGINE WELDER AND ELECTRIC COMPRESSOR

(75) Inventors: David J. Bender, Chardon, OH (US); Bryce Muter, Eastlake, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/221,985

(22) Filed: Sep. 9, 2005

(65) Prior Publication Data

US 2006/0043083 A1 Mar. 2, 2006

Related U.S. Application Data (63) Continuation of application No. 10/758,641, filed on Jan. 15, 2004, now Pat. No. 6,992,265.

(51) Int. Cl.
*B23K 9/10* (2006.01)

(52) U.S. Cl. ...................... 219/133; 290/1 A (58) Field of Classification Search ............... 219/133, 219/134; 290/1 R, 1 A, 40 R
See application file for complete search history.

(56) References Cited

U.S. PATENT DOCUMENTS

| | | |
|---|---|---|
| 1,929,887 A | 10/1933 | Gustafson |
| 2,836,736 A | 5/1958 | Johnson |
| 2,999,950 A | 9/1961 | Johnson |
| 3,227,979 A | 1/1966 | Kamp |
| 3,659,183 A | 4/1972 | Carlson |
| 3,720,842 A | 3/1973 | Martin et al. |
| 4,173,951 A | 11/1979 | Ishihara |
| 4,293,281 A | 10/1981 | Lamoreaux |
| 4,465,920 A | 8/1984 | Hoyt, Jr. et al. |
| 4,698,975 A | 10/1987 | Tsukamoto et al. |
| 5,341,644 A | 8/1994 | Nelson |
| 5,386,873 A | 2/1995 | Harden et al. |
| 5,795,136 A | 8/1998 | Olsaker et al. |
| 5,907,970 A | 6/1999 | Havlovick et al. |
| 5,928,535 A | 7/1999 | Trinkner et al. |
| 6,051,809 A | 4/2000 | Colella |
| 6,065,942 A | 5/2000 | Glidden et al. |
| 6,099,265 A | 8/2000 | Rowe, Jr. et al. |

(Continued)

FOREIGN PATENT DOCUMENTS

DE 3739726 9/1989

(Continued)

OTHER PUBLICATIONS

Brochure by Miller Electric Mfg. Co. Regarding Big Blue Air Pak dated Jul. 2000.

(Continued)

*Primary Examiner*—Kevin P. Kerns
(74) *Attorney, Agent, or Firm*—Fay Sharpe Fagan Minnich & McKee; Brian E. Turung (57) ABSTRACT

An integrated welder, generator and compressor unit that includes a housing that at least partially contains components of a welder, generator and an electric compressor. An engine, an electric current generator, and an electric air compressor are at least partially mounted in the housing. The electric current generator is at least partially connected to the engine to be at least partially driven thereby. The electric air compressor can be at least partially powered by the electric current generator during the operation of the engine. Alternatively, the air compressor can be powered by an external source of power without the use of the engine/generator.

21 Claims, 5 Drawing Sheets

U.S. PATENT DOCUMENTS

| | | |
|---|---|---|
| 6,172,332 B1 | 1/2001 | Trinkner et al. |
| 6,263,926 B1 | 7/2001 | Bender et al. |
| 6,296,027 B1 | 10/2001 | Bender et al. |
| 6,331,694 B1 | 12/2001 | Blankenship |
| 6,362,533 B1 | 3/2002 | Morohoshi et al. |
| 6,435,925 B1 | 8/2002 | Mabru |
| 6,472,635 B1 | 10/2002 | Trinkner et al. |
| 6,534,958 B1 | 3/2003 | Graber et al. |
| 6,596,972 B1 | 7/2003 | Di Novo et al. |
| 6,619,337 B1 | 9/2003 | Vickers |
| 6,660,967 B1 | 12/2003 | Brofft et al. |
| 6,670,580 B1 | 12/2003 | Brofft et al. |
| 6,674,046 B1 | 1/2004 | Bankstahl et al. |
| 6,909,068 B1 | 6/2005 | Alleman, Jr. et al. |
| 6,933,465 B1 | 8/2005 | Bankstahl et al. |
| 6,989,509 B1 * | 1/2006 | Silvestro ................. 219/133 |
| 6,992,265 B1 * | 1/2006 | Bender et al. ............ 219/133 |
| 2004/0104209 A1 | 6/2004 | Bankstahl et al. |
| 2004/0182846 A1 | 9/2004 | Silverstro |

FOREIGN PATENT DOCUMENTS

| | | |
|---|---|---|
| FR | 2.331.414 | 7/1977 |
| WO | WO 02/36948 | 5/2002 |

OTHER PUBLICATIONS

Brochure by Miller Electric Mfg. Co. Dated Oct. 1996.
Brochure by Lincoln Electric regarding Ranger 9 dated May 1995.
Brochure by Miller Electric Mfg. Co. Dated Sep. 1996.

* cited by examiner

INTEGRATED ENGINE WELDER AND ELECTRIC COMPRESSOR

This patent application is a continuation of U.S. patent application Ser. No. 10/758,641 filed Jan. 15, 2004 now U.S. Pat. No. 6,992,265.

The present invention relates generally to engine driven welding machines, and more particularly to a welder/generator and compressor unit that can be transported to a site for welding and/or for operating air and/or electric power tools.

INCORPORATION BY REFERENCE

Assignee's U.S. patent application Ser. No. 10/390,436 filed Mar. 17, 2003 now U.S. Pat No. 6,989,509, is incorporated herein and illustrates one type of integrated welder, generator and compressor unit.

BACKGROUND OF THE INVENTION

Engine driven welding machines include a gas powered engine to run a generator which supplies power to the welding electrode. Two such engine welders are disclosed in U.S. Pat. Nos. 6,296,027 and 6,172,332, both of which are incorporated herein by reference. The generator can also be used to operate other electrical equipment (e.g., lights, pumps, etc.). On a construction site, welding equipment and other types of equipment are commonly used. The engine driven welder is commonly used to provide electrical power to electric welders, lights, power tools, etc. Air powered tools are also commonly used at a construction site. Such tools are typically powered by a separate air compressor.

While both of these units have satisfactorily provided power to various tools at construction sites, the use of both an air compressor and an engine driven welder has some disadvantages. Although the engine welder and air compressor are portable, it is nevertheless difficult and time consuming to load and unload these two separate units, and then position and setup the various components which are to be used with such units. In addition, the two separate units require a certain amount of space in a transport vehicle, thus can result in multiple vehicles having to be used to transport all the components associated with the two units. Furthermore, some air compressors are powered by electricity. When such electric compressors are used at a work site, the air compressor may be plugged into and powered by the generator of the engine welder, thus reducing the available power for use with other power tools.

In an effort to address the past problems associated with the use of a separate engine welder and air compressor, a self contained integrated welder/generator and compressor is disclosed in U.S. Pat. No. 6,051,809, which is incorporated herein by reference. The '809 patent discloses a self-contained and fully integrated welder/generator and compressor unit that is capable of being loaded onto and carried by a pickup truck. The welder/generator and compressor unit include a housing having a length that generally corresponds to the width of a pickup truck and having a vertical height for receiving and containing components of the welder/generator and compressor unit (e.g., compressor, generator, welder electronics, engine, fuel tank, etc.). An engine and an electrical current generating alternator are mounted within the housing of the welder/generator and compressor unit. The electrical current generating alternator is connected to the engine to be driven thereby, and the alternator includes an output drive shaft that drives a belt which in turn powers an air compressor. The housing includes an output panel that includes electrical outlets, welding lead receptacles, air compressor outlets, etc.

Although the '809 patent addresses some of the disadvantages associated with a separate engine welder and air compressor, several problems still remain. The housing of the welder/generator and compressor unit is specifically designed to fit in the rear of a pickup truck. If the pickup truck cannot be positioned near a particular work site, the welder/generator and compressor unit must be removed from the pickup truck and carried to the particular work site. Furthermore, the '809 patent discloses that the air compressor is connected to the shaft of the alternator by a belt which can require periodic maintenance. In addition, belt drives typically include a crankshaft pulley(s) and may use a magnetic clutch to control the belt drive. These components have a tendency to quickly wear out, thereby requiring periodic maintenance.

Another engine welder and air compressor is disclosed in United States Patent Application Publication No. 2003/155,339 published on Aug. 21, 2003 entitled "Screw air compressor for a welder", which is incorporated herein by reference. The '399 patent publication discloses welder having an internal screw air compressor that is belt driven by the engine in the housing of the engine welder. The engine is designed to work in conjunction with a has a pulley arrangement connected by belts to drive the screw air compressor, an alternator, and an engine cooling fan. A clutch assembly connected to the screw air compressor to control the screw air compressor. As previously discussed, such an arrangement tend to quickly wear out, thereby require periodic maintenance.

Assignee's U.S. patent application Ser. No. 10/390,436 filed Mar. 17, 2003, now U.S. Pat. No. 6,989,509, discloses an integrated welder and compressor unit that overcomes the past problems with these prior welder and compressor units. The integrated engine driven welder and compressor unit disclosed in the '436 patent application can be conveniently transported to a site for welding, operating air and/or electric power tools, and is more easily operated and maintained by a user. The integrated engine driven welder and compressor unit disclosed in the '436 patent application discloses an air compressor connected to the drive shaft of the engine and/or electrical alternator by a gear box. The gear box can have a single gear ratio or multiple gear ratios to thereby control the desired speed of the compressor. The use of the gear box eliminates the need for a belt that must be periodically replaced and/or the tension being periodically adjusted as was required in prior art designs. The use of the gear box also allows the speed of the compressor to be better controlled. The use of the gear box typically simplified and/or reduced the space requirements needed to connect the compressor to the drive shaft of the engine and/or electrical alternator, thus simplifying the assembly of the integrated welder/generator and compressor unit by reducing the number of components needed to connect the gear box between the air compressor and the engine and/or electric current generator. The use of the gear box also resulted in reduced cost due to the simpler design and fewer parts. The use of the gear box further resulted in less maintenance since the gear box is more durable than a belt and pulley system, especially one that utilizes one or more clutches.

Although the integrated engine driven welder and compressor unit disclosed in the '436 patent application was a significant improvement over prior art integrated engine driven welder and compressor units, the use of a gear box to drive the compressor unit limits the location in which the compressor can be positioned in the housing of the engine welder. In order to minimize the space and positioning limitations within the welder housing, special or more complex gearing arrangements are required. Air compressors that are powered by gears are also typically more expensive than electric powered air compressors due to the more complex design of the gear and belt powered compressors.

In view of the limitations of integrating a gear powered air compressor with an engine welder, there remains a need for an integrated engine driven welder and compressor unit that can provide both electrical power and air pressure for use by various types of tools at a work site, that enables the air compressor to be ergonomically positioned within the housing of the engine welder, and that simplifies the design and reduces manufacturing cost for the integrated engine driven welder and compressor unit.

SUMMARY OF THE INVENTION

The present invention is directed to an integrated engine driven welder and compressor unit that can be conveniently transported to a site for welding and/or for operating air and/or electric power tools, and can by operated and maintained by a user.

In accordance with one aspect of the present invention, there is provided a self-contained and fully integrated welder/generator and compressor unit. The integrated welder/generator and compressor unit is provided with a housing to protect the internal components of the welder. At least partially protected by the housing is a fuel powered engine and an electric generator. The fuel powered engine runs the electric generator which in turn produces electricity for the arc welder. The electric generator is selected to produce electricity for various types of arc welders such as, but not limited to, TIG welders, plasma arc welders, SAW welders, MIG welders, STT and other waveform welders. Electric circuitry can be included within the housing to control the amount of current, voltage, power and/or the waveform of current directed to the electrode of the welder. A fuel tank is typically provided within the housing to supply fuel to the fuel powered motor. The fuel tank can be positioned in various areas within the housing, but is generally positioned at or near the base of the housing or engine welder. A filler tube is typically connected to a portion of the fuel tank and extends upwardly from the fuel tank and through a portion of the housing to enable an operator to refill the fuel tank. The filler tube and fuel tank can be made from one or multiple pieces of material. The filler tube and fuel tank are typically made of a durable material such as, but not limited to, plastic and/or a metal material. The engine welder typically includes a control panel to operate various internal components of the welder and/or to provide connectors to various components of the welder. A fixed or adjustable exhaust pipe for the fuel power engine can be included on the engine powered welder. These and other standard components of an engine driven welder are disclosed in U.S. Pat. Nos. 6,172,332; 6,263,926 and 6,296,027, which are incorporated herein by reference. The engine welder housing can also include one or more storage compartments and/or holders adapted to store and/or hold various welding tools, air tools, maintenance tools, electrodes, coolant, gas cylinders and/or other supplies on or within the housing. One non-limiting arrangement of the one or more storage compartments and/or holders that can be used is disclosed in U.S. Pat. No. 6,596,972, which is incorporated by reference. The engine welder can be transported by a welding carriage; however, this is not required. One non-limiting welding carriage which can be used is disclosed in Assignee's U.S. patent application Ser. No. 09/411,106, filed Oct. 4, 1999, now U.S. Pat. No. 6,909,068, which is incorporated herein by reference. The engine powered welder can also include a filler tube and fuel tank arrangement that includes a fuel gauge to monitor the fuel level in the filler tube and/or fuel tank; however, this is not required. The fuel gauge, when used, enables an operator to monitor fuel levels within the filler tube and/or fuel tank to enable an operator to anticipate when the engine welder needs to be refueled and/or to notify an operator during the refueling process of the fuel tank when the fuel tank is filled, thereby avoiding spillage and waste of fuel. The minimizing of spillage can reduce damage to the welder and/or components about the welder, and the time and money required for clean-up of the spilled fuel. One non-limiting configuration of the filler tube and fuel tank that can be used is disclosed in U.S. Pat. Nos. 6,172,332; 6,263,926; 6,296,027; and 6,619,337, which are incorporated herein by reference. A grommet or insert can also be used in the fueling cavity of the housing. The grommet or insert, when used, is designed to at least partially seal the region about the fueling cavity to inhibit and/or prevent fluids from entering the interior of the housing. One non-limiting configuration of a grommet or insert that can be used is disclosed in U.S. Pat. Nos. 6,172,332; 6,263,926; 6,296,027; and 6,619,337. In one embodiment of the invention, the air compressor that is at least partially positioned in the housing can be connected to the engine (e.g. drive shaft, auxiliary shaft, etc.) and/or electrical alternator in the housing. Many types of air compressors can be used (e.g., piston or reciprocating compressors, rotary or screw compressors, centrifugal or axial compressors, etc.). The air compressor can have a compressed air outlet mounted to the housing. Unlike the connection disclosed in U.S. Pat. No. 6,051,809 or Assignee's U.S. patent application Ser. No. 10/390,436 filed Mar. 17, 2003, now U.S. Pat. No. 6,989,509, the air compressor is an electric air compressor that can be powered by the current generated by the electrical alternator in the engine welder housing and/or powered by an external power source (e.g. electrical outlet in a building, a portable electrical generator, etc.).

In accordance with another and/or alternative aspect of the present invention, the electric air compressor can be ergonomically positioned within the housing of the engine welder. The use of an electric powered compressor as opposed to a belt driven or gear driven compressor enables the compressor to be positioned in a variety of locations in the engine welder housing. In the past, the position of the compressor was in part limited to the location of the belt or gearing arrangement used to drive the compressor. The present invention overcomes this disadvantage of past configurations for integrated engine welder and compressors. The electric powered compressor can be positioned anywhere in the housing that has sufficient space for the compressor. The versatility of positioning the air compressor in the welding housing significantly improves the ease of design of the engine welder and compressor.

In accordance with still another and/or alternative aspect of the present invention, the electric air compressor is partially or fully powered by the electric generator of the engine welder. During the operation of the engine welder, the engine drives an electric generator to create an electrical current that is used to power a particular arc welding process. The engine welder typically includes one or more circuits to provide standard 120V and/or 240V AC power.

Commonly, the exterior of the housing will include one or more outlets that allows one or more external electrical devices to be plugged into the engine welder and to be powered by the engine welder during the operation of the engine in the engine welder. The electric air compressor can be electrically connected to the current from the one or more power circuits of the engine welder so as to be supplied with power by the engine welder when the electric generator is being powered by the engine in the engine welder. In one embodiment, the housing of the engine welder includes a switch used to activate and deactivate the electric air compressor. The switch allows the operator to only activate the electric air compressor when needed. The activation/deactivation or on/off switch for the electric air compressor is typically located on the front face of the engine welder where many of the other control knobs and/or switches are located; however, the activation/deactivation or on/off switch for the electric air compressor can be located in other areas on the engine welder.

In accordance with yet another and/or alternative aspect of the present invention, the electric air compressor is partially or fully powered by an external power source. In this aspect of the invention, the electric air compressor can be powered by an external power source so that the engine in the engine welder does not have to run every time the air compressor needs to be used. There may be times that the air compressor is needed and no welder operation is required. In these situations, it can be advantageous to run the air compressor off of an external power source without having to run the engine welder engine. The running of the engine welder engine produces significantly greater power than required by the air compressor. As such, running the engine welder engine to only supply power to the air compressor results in a waste of energy and unwanted wear of the other components of the engine welder. It is not uncommon at a construction site to have access to power from standard transmission lines. When available, power from these transmission lines is more than adequate to power the compressor. The electrical connector for the air compressor to receive external power can be built into the housing of the engine welder (e.g., front panel) or be an electrical cord that hangs from the welder housing or is stored in a compartment in the welding housing. As can be appreciated, many other arrangements can be designed to enable the air compressor to be electrically connected to an external power source.

In accordance with still yet another and/or alternative aspect of the present invention, the electric air compressor can be energized from either the electrical generator in the engine welder housing or from an external power source. The ability for the air compressor to be energized from multiple energy sources enhances the versatility of the air compressor. When the air compressor is designed to be powered from multiple energy sources, the engine welder typically includes an electric circuit that is used to manually or automatically select the power source to be used by the air compressor. When the circuit includes a manual power selector, the selector is typically in the form of a switch; however, other types of manual selectors can be used. In this arrangement, the operator manually selects whether the air compressor is to receive power from the power generated from the engine welder or power from an external source. The manual selector is then oriented or activated by the user to cause the electric circuit to direct power to the air compressor from the source selected by the user. When the electrical circuit is designed to automatically select a power source for the air compressor, the electrical circuit can be designed in many different ways. In one non-limiting circuit design, the circuit senses one or more of the available power sources that can be used to power the air compressor and then selects the power source. For instance, the circuit can be designed to detect whether the engine welder is generating power, and if so, cause some of the generated power to be directed to the air compressor. This same circuit can also be designed to electrically connect the air compressor to an external power source if the circuit does not detect power being generated by the engine welder. A circuit can be also designed to select one available energy source over another. For instance, a circuit can be designed to detect whether multiple power sources are available to power the air compressor, and if so, automatically select one power source over another. As can be appreciated, an electrical circuit that automatically selects a power source could include an manual override selector to allow a user to select a particular power source for powering the air compressor. The above examples of electrical circuits is exemplary only, and in no way limits the many circuit designs that can be used to manually, semi-automatically or automatically select a power source to power the electrical air compressor.

In accordance with a further and/or alternative aspect of the present invention, the air compressor assembly includes an electric motor, a compressor unit driven by the electric motor, and a compressed air receiver or accumulator tank can be at least partially mounted in the housing and be connected to the compressed air output of the air compressor unit. The receiver tank is used to store compressed air. As can be appreciated, a plurality of receiver tanks can be positioned in the housing of the engine welder. When a receiver tank is used, one or more pressure monitors are typically used to monitor the pressure in the one or more receiver tanks. The monitor is designed to at least partially monitor the pressure in the receiving tank. In one non-limiting design, the pressure monitor can be designed to send a signal when the detected pressure falls below a preset value and/or rises above a preset value. In this design, the signal generated by the pressure monitor can be used to activate the motor of the air compressor assembly when the detected pressure is too low or stop the motor when the detected pressure reaches a desired value or is too high. A pressure gauge can be positioned on the housing of the engine welder (e.g., front panel) to enable a user to monitor or read the current pressure level in the receiver tank. The air pressure assembly also includes a pressure valve that is typically designed to be connected to a hose of an air powered tool or device; however, the pressure valve can be designed to alternatively or additionally connected to other devices. Typically, the pressure valve is a typical valve used in association with air compressor equipment; however, any type of air pressure valve can be used. The pressure valve is typically located on the front panel of the welder housing; however, the valve can be positioned in other locations. The pressure valve can be designed to send a signal when the pressure valve opens or closes. This signal can be used to at least partially control the activation or deactivation of the motor of the compressor assembly.

The principal object of the present invention is to provide an engine welder that can supply power to welding equipment and compressed air to various types of air tools.

Another object of the present invention is to provide an engine welder that is more convenient and easier to operate.

Still another and/or alterative object of the present invention is to provide an engine welder which is easier to set up and/or transport to various locations.

Yet another and/or alterative object of the present invention is to provide an engine welder which is easy to assemble, easy to connect the welding accessories of a welder to the housing, easy to connect the air tools to the housing, and/or easy to transport the welding accessories and/or air tools along with the engine welder to various locations.

Still yet another and/or alternative object of the present invention is to provide an engine welder that includes an air compressor.

A further and/or alternative object of the present invention is to provide an engine welder that includes an electric powered air compressor that is simple, reliable and durable to use, and which electric air compressor can be ergonomically positioned in the housing of the engine welder.

Still a further and/or alternative object of the present invention is to provide an engine welder that includes a electric powered air compressor which is powered by the electric generator in the engine welder and/or by an external power source.

Yet a further and/or alternative object of the present invention is to provide an engine welder that includes a pressure monitoring system that monitors and/or controls the pressure in one or more components of the engine welder.

These and other objects and advantages of the invention will become apparent to those skilled in the art upon reading and following this description taken together with the accompanying drawings.

BRIEF DESCRIPTION OF THE DRAWINGS

Reference may now be made to the drawings which illustrate various embodiments that the invention may take in physical form and certain parts and arrangements of parts wherein.

DESCRIPTION OF PREFERRED EMBODIMENTS

Figure 1:
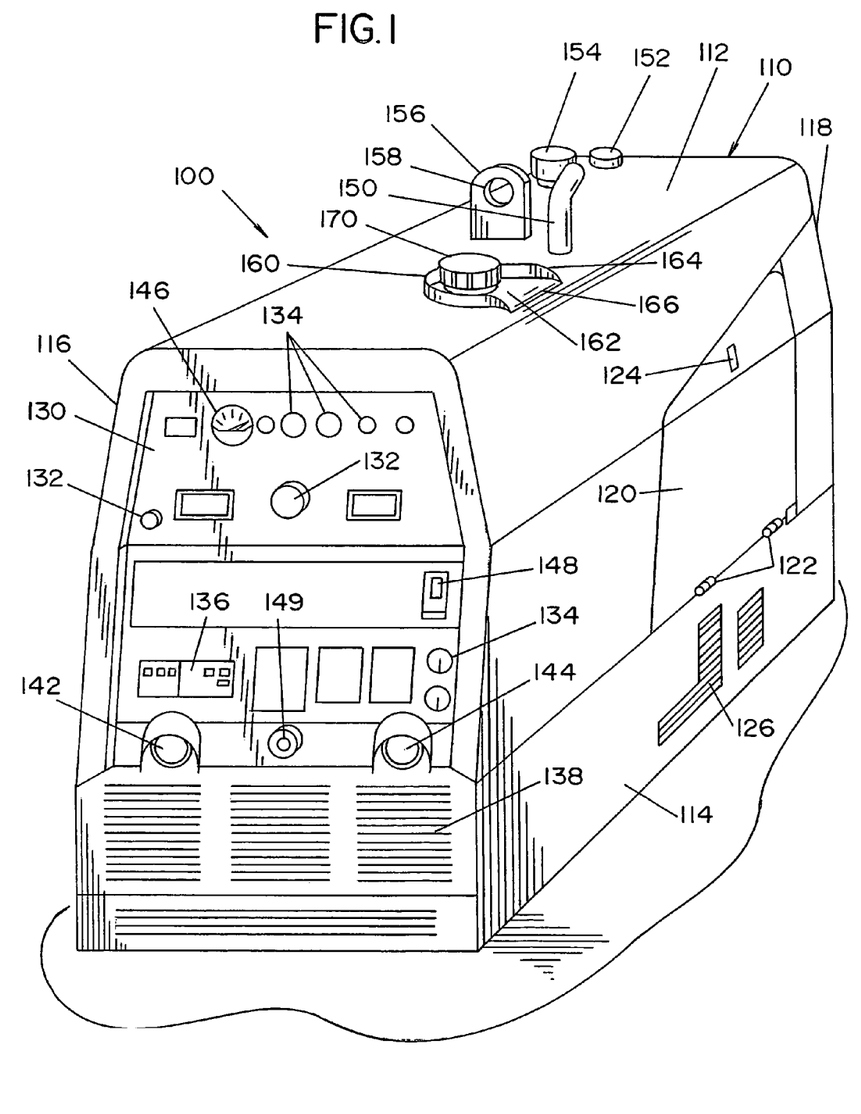
FIG. 1 is a perspective view of an assembled engine welder in accordance with the present invention.
Figure 2:
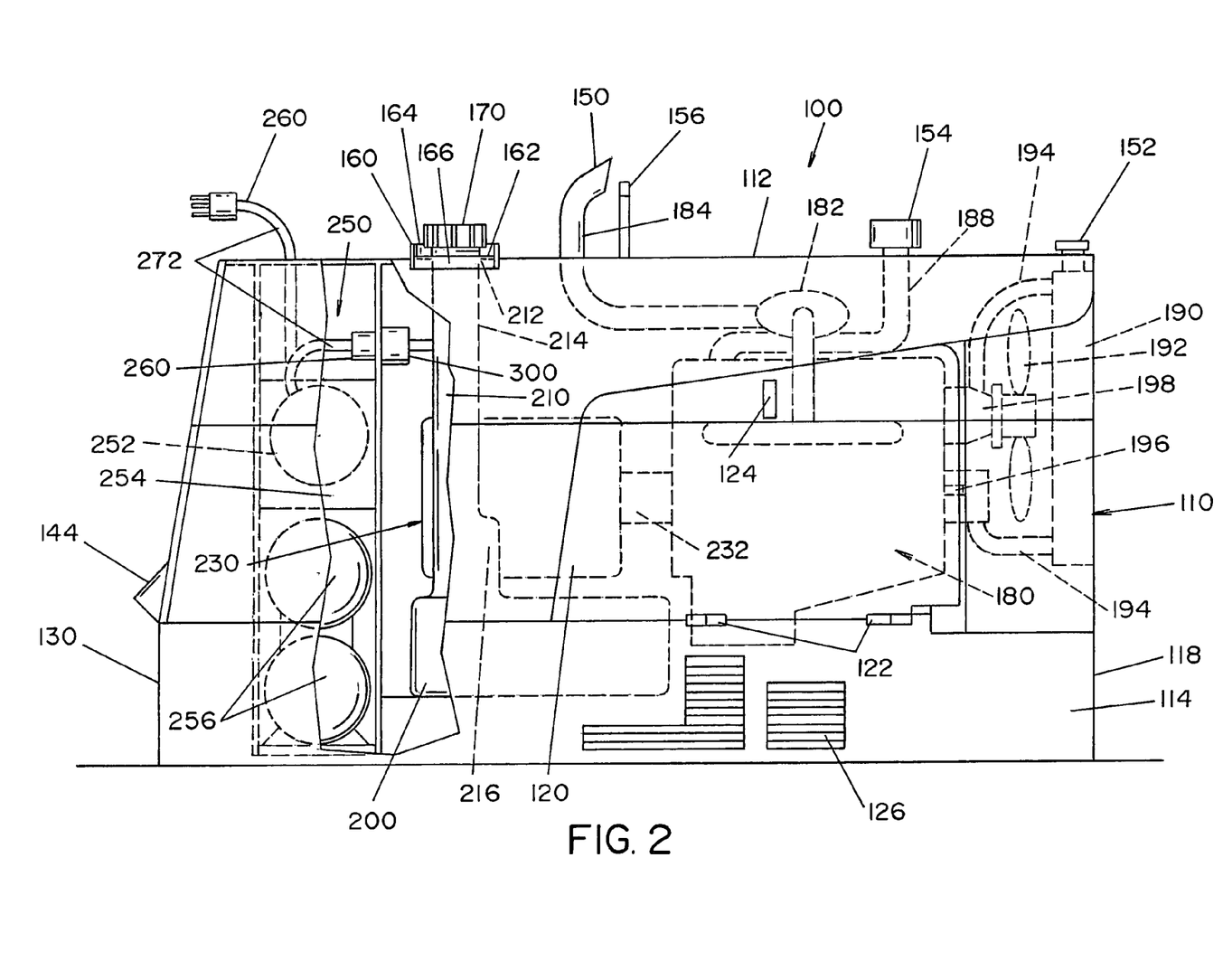
FIG. 2 is a partial cut away view of the side of the engine welder of FIG. 1.
Figure 2A:
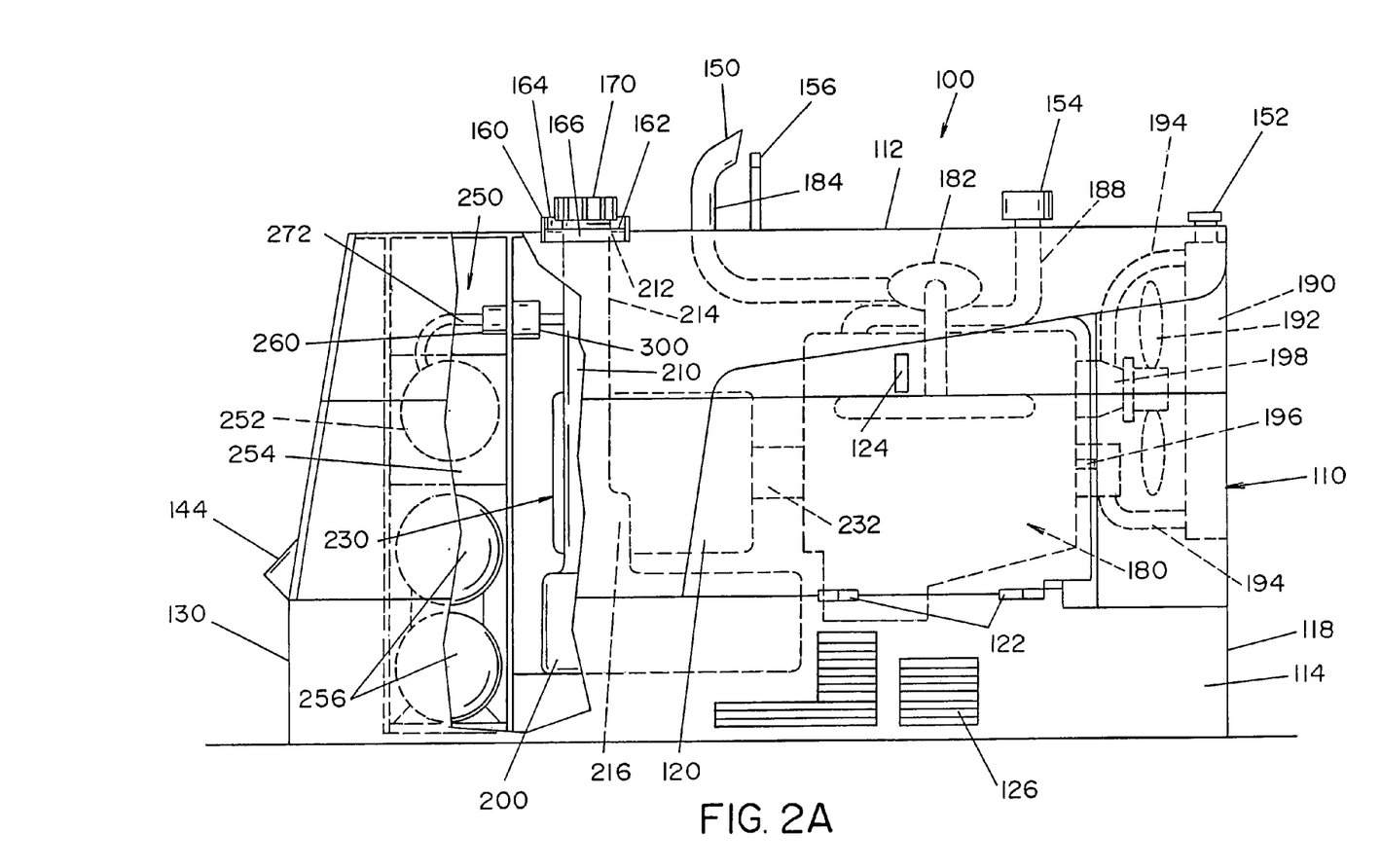
FIG. 2A is another partial cut away view of the side of the engine welder of FIG. 1 without a plug for an external power source.
Figure 3:
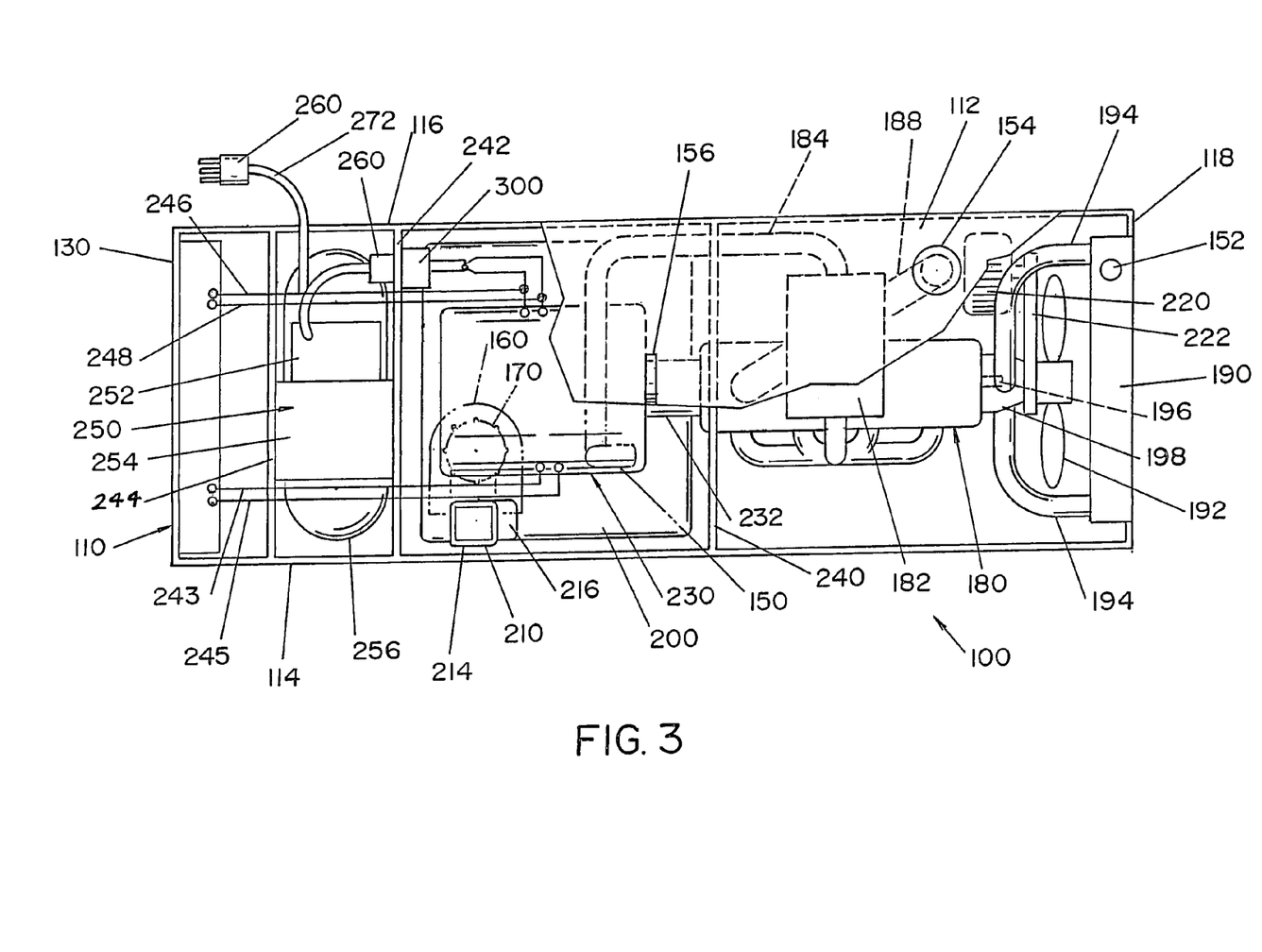
FIG. 3 is a partial cut away view of the top of the engine welder of FIG. 1.

Referring now to the drawings, wherein the showings are for the purpose of illustrating the preferred embodiments of the invention only and not for the purpose of limiting the same, FIGS. 1–3 illustrate one embodiment of the invention. Specifically, these figures illustrate a self-contained, portable and fully-integrated welder/generator and compressor unit 100 in accordance with the present invention. Unit 100 includes a housing 110 that having a top portion 112, two side portions 114, 116, a back side 118 and a front panel 130. The welding housing is designed to encase at least a portion of the internal components of the engine welder. Positioned in the top portion 112 of welding housing 110 is an exhaust pipe 150. The top of the housing typically includes one or more fluid accesses 152, 154 to add coolants, lubricants, etc. to the engine located in the housing. The top of the housing also typically includes a lift device 156 having an opening 158. The lift device is used to lift and/or move the engine welder by use of a crane or similar apparatus. A grommet 160 is also located on the top portion of the housing. A fuel cap 170 is used to close the opening into the filler tube that is used to fill the fuel tank of the engine welder. An engine access panel 120 is located on side 114 of the housing. The access panel allows a user access to the serviceable components of the engine. The access panel to connected to hinges 122 to enable the panel to be opened. A latch or handle 124 is used to open and close the access panel. One or more sides of the housing include air vents 126 to allow air flow through the housing so as to facilitate in cooling the internal components of the housing. Housing 110 can include one or more compartments, not shown, that provide a storage area for welding tools, nail guns, electric saws, lights, etc.

The front face or panel 130 of housing 110 also includes a vent 138 that allows for air flow within the housing. The front panel also includes various switches, knobs, indicator lights and meters and gauges 132, 134, 136 to monitor and/or control the operation of the welder/generator and compressor unit. The front panel also includes electrical connectors 142, 144 to connect a welding gun and/or other electrical equipment to the welder/generator and compressor unit. Typically the front face includes at least one 120 volt connector and at least one 240 volt connector; however, other combinations can be used (e.g., two 120 connectors, two 240 volt connectors, etc.). As can be appreciated, the voltage rating can be other than 120 and/or 240 volts (e.g. 230V, 277V, 380V, 400V, etc.). As can be further appreciated, one or more volt connectors can be positioned on the front face and/or other locations on the welder/generator and compressor unit. The front panel and/or one or more other regions of the welder/generator and compressor unit can include one or more features of the welder/generator and compressor unit, e.g., an on/off key slot, a start button for the internal combustion engine, one or more circuit breakers, a light, voltage and/or current meters, welding current settings, warning indicators, etc. One non-limiting designs for the front panel of the engine welder is similar to that of the RANGER series of engine welders offered by The Lincoln Electric Company. As can be appreciated, many other configurations can be used based on desired aesthetics of the front panel, engine welder functions, etc.

The front panel of the housing also includes an air compressor switch 148 to activate and deactivate the air compressor. A compressed air outlet 149 is positioned on the front panel to supply compressed air to various types of air power tools (e.g., nail gun, paint gun, pressure washer, sand blaster, etc.). As can be appreciated, more than one compressed air outlet can be positioned on the front panel. As can also be appreciated, one or more compressed air outlets can be located on other regions of the housing. In addition, the air compressor switch can be located in other regions of the housing. An air pressure gauge can be positioned on the housing to provide information on the pressure level of the air being expelled from the compressed air outlet.

Contained within the housing 110 is an internal combustion engine 180 that is mounted at one end of the housing 110. The internal combustion engine is typically provided with an air cleaner, a muffler 182, an exhaust pipe 184, an oil filler tube 188 and a battery (not shown) to start the engine. A radiator 190 and fan 192 are included in the housing to cool the engine are also typically provided in the housing. Coolant tubes 194 allow the coolant to flow from the radiator into the engine. The coolant access 152 on the top of the housing allows a user to add coolant and/or monitor the coolant level in the radiator. A fuel tank 200 located in the base of the housing supplies fuel to the engine. Typically, the fuel tank is secured to the bottom of the housing. Positioned on the top region of fuel tank 200 is a filler tube 210 which extends upwardly from the fuel tank and to a tube access opening 212 in the top of housing 110. The filler tube and the fuel tank are shown to be made of a one-piece material; however, the filler tube can be connected to the fuel tank in other arrangements (e.g. weld, solder, adhesive, etc.). The filler tube is also illustrated as being formed from a single piece of material; however, the filler tube can be formed from multiple components. The fuel tank and filler material can be made of the same or different materials. The filler tube includes a top portion 214 and a bottom portion 216. The base of the filler tube has a larger cross-sectional area than top of the filler tube. The cross-sectional shape of the filler tube is shown to be generally rectangular. The bottom portion of the filler tube has a larger diameter rectangular cross-sectional area than the rectangular cross-sectional area of the top portion. A majority of the bottom portion of the filler tube is shown to have a substantially constant cross-sectional area. Close to the top region of the bottom portion, the cross-sectional area tapers downwardly at a transition area until obtaining the size of the cross-sectional area of the top portion. The cross-sectional area of the top portion is illustrated as being substantially uniform along the complete longitudinal length of the top portion. As a result, the bottom portion of said filler tube has a cross-sectional area that is greater that any region in the top portion of the filler tube. As can be appreciated, other cross-sectional shapes can be used for the top and/or bottom portion of the filler tube. The large cross-sectional area and volume of the bottom portion of the filler tube is designed to reduce the rate at which the fuel rises in the filler tube after the fuel tank has been filled. The reduced rate that the fuel rises in the filler tube during the filling of the filler tube with fuel allows an operator more time to terminate the flow of fuel into the filler tube once the operator is notified or learns from the fuel level indicator that the fuel tank is filled.

As best shown in FIGS. 1 and 2, the top of the filler tube extends through the access opening on the top of the housing and through grommet 160. Grommet 160 is inserted into tube access opening 212 and seals the tube access opening to inhibit or prevent fluids from entering the interior of the housing. The grommet is also designed to direct fuel that inadvertently spills into the grommet to a side of the engine welder. The grommet is generally a one-piece structure made of a flexible material such as rubber. As can be appreciated, the grommet can be a multi-piece structure that is connected together by various means (e.g. heat, adhesive, etc.). Grommet 160 includes a base surface 162 and a side wall 164 that extends about the outer perimeter of the grommet. The base surface and side wall form an internal cavity in the grommet. A tube opening is positioned in the base surface of the grommet. The shape of the tube opening is selected to enable the top of the filler tube to extend through the tube opening and to form a seal about the filler tube. Typically the tube opening closely matches the cross-sectional shape of the top of the filler tube or top fill section that extends through the tube opening. The grommet can be secured in the access opening in a variety of ways. Grommet 160 is shown as including a lip 166. The lip is illustrated as partially curving over a side of the housing of the engine welder. The lip is designed to direct fluids that have inadvertently spilled into the grommet internal cavity to flow outwardly from the cavity and over the side of the side of the housing. As such, the lip facilitates in the flow of fluids from the internal cavity of the grommet. The grommet can be designed so that when the grommet is secured in tube access opening, the base surface of the grommet slopes downwardly toward the lip. The sloped base surface causes fluids which have inadvertently spilled into the internal cavity of the grommet to flow out of the internal cavity and onto the lip and then over the side of the housing. The sloped surface also causes the fluid flowing from the internal cavity of the grommet to accelerate as the fluid approaches the lip. The faster moving the fluid facilitates in the fluid flowing over the lip.

A fuel level monitor is typically used to indicate the level of fuel in the fuel tank. The fuel level monitor includes a fuel gauge 146 located on the front panel of the housing and a fuel level sensor (not shown) located in the fuel tank and/or filler tube. The fuel lever sensor is designed to measure one or more fuel levels in the fuel tank. The fuel level sensor can be designed to use mechanical, chemical and/or electrical means to detect a fuel level. The fuel level indicator provides the operator with information on the amount of fuel left in fuel tank, thereby providing the operator with information to determine whether a particular operation should be started and completed prior to the fuel in the fuel tank being exhausted. If an operator determines that the operation will take more time than the amount of fuel in the fuel tank can provide to run the engine, the operator can refill the fuel tank prior to operation so that the operation does not have to be prematurely terminated and restarted due to the engine running out of fuel. The fuel gauge can include a light to illuminate when one or more detected fuel levels in the fuel tank and/or filler tube are detected, or illuminate when the fuel level monitor is in operation. A audible alarm (not shown) can be included on the housing. The audible alarm, when used, is designed to make a sound when one or more detected fuel levels in the fuel tank and/or filler tube are detected. The audible alarm can be designed to generate different sounds and/or sound levels for different detected fuel levels. The audible alarm can include a light to illuminate when one or more detected fuel levels in the fuel tank and/or filler tube are detected. The light, like sound, is used to draw the operator's attention to the fuel gauge. The audible alarm is used to draw an operator's attention to the fuel gauge so as to notify the operator that a particular fuel level in the fuel tank has been reached and/or exceeded. During the fuel of the engine welder, the operator may become distracted. The audible alarm is useful in regaining the attention of the operator during the fueling process so that proper monitoring of the level of fuel in the fuel tank occurs during the fueling process. As can be appreciated, the audible alarm can be used as a back up monitor in the instances wherein the fuel gauge fails or provides an inaccurate fuel level reading. The fuel level monitor, when used, can be electrically powered and/or be mechanically operated. When the fuel level monitor is electrically powered, the fuel level monitor can be can powered by the electricity generated by the engine welder during operation of the engine welder and/or powered by a alternative or additional power source (e.g., battery, solar cell, fuel cell, etc.).

Referring again to FIGS. 2 and 3, an electric current generator 230 is mounted within the housing 110. The electric current generator is connected to internal combustion engine 180 by a motor shaft 232. The motor shaft is typically directly connected to electric current generator 230; however, a gear box and/or belt drive, not shown, can be inserted therebetween to control and/or regulate the speed at which the electric current generator is operated by internal combustion engine 180. In one particular, non-limiting arrangement, internal combustion engine 180 is a water cooled and/or air cooled engine. The engine is designed to operate at a nominal speed of 1800 RPM with a 4-pole generator design or 3600 RPM with a 2-pole generator design. The auxiliary power provided by the electric current generator is normally about 60 hertz so as to be able to run standard power tools and lights. As can be appreciated, other sized engines and/or alternators can be used. Engine 180 typically includes an auxiliary drive output shaft 196. A primary drive 198 is typically connected to the cooling fan 192. The cooling fan can be driven by an electric fan motor 220 that is connected to the fan by a fan belt 222. As shown in FIG. 3, the housing is divided into several sections by internal wall partitions 240, 242, 244. The partition walls provide structural strength to the housing and divide the internal components of the housing from one another. The division of the internal components by the partition walls also can be used to protect the components from one another. Partition wall 240 divides the section containing the combustion engine from the section containing the electric generator. Motor shaft 232 passes through an opening in partition wall 240. Typically located in the same section as the electrical generator is the electrical circuitry used to generate the arc currents of the engine welder through electrical connectors 142 and 144. As shown in FIG. 3, wires 243, 245 supply power to electrical connector 144 and wires 246, 248 supply power to electrical connector 142. As can be appreciated, one or more electrical circuits can be located on other regions in the housing. A contact connector/switch 300 is also positioned in the section between partitions 240,242. Contact connector/switch 300 is used to receive an internal plug 260 from motor 252 of air compressor 250. The contact connector/switch is electrically connected to the electric generator. Typically the power from the electric generator is 120V or 240V power for the electric motor 252. As can be appreciated, the contact connector/switch can be located in a different area within the housing.

Figure 5:
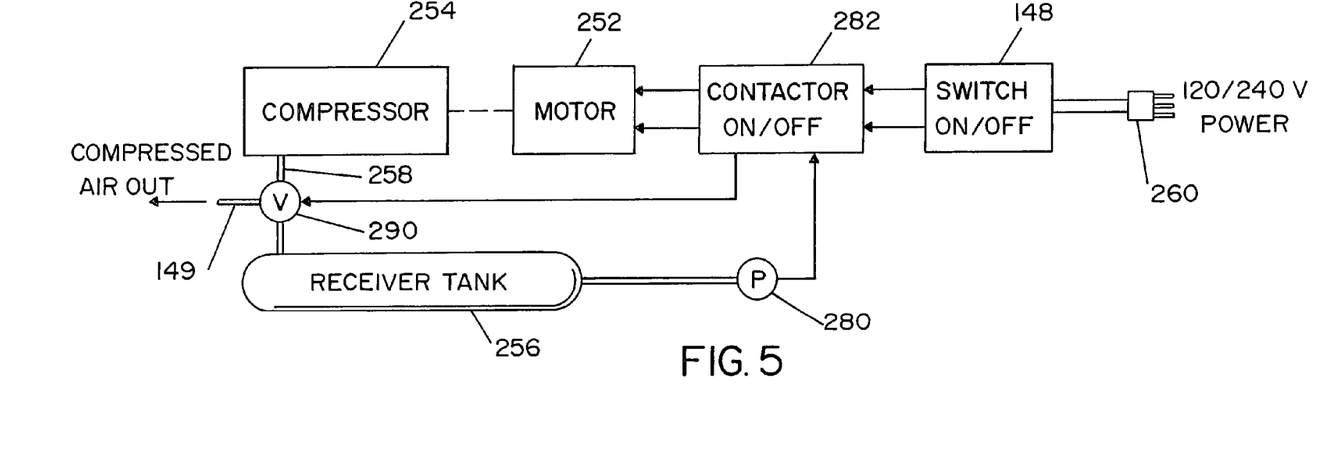

The air compressor 250 is mounted within housing 110 between partitions 242 and 244 as illustrated in FIG. 3. The air compressor includes an electric motor 252 that drives a compressor 254. One or more air accumulator tanks 256 are fluidly connected to compressor 254. The air accumulator tanks are positioned in the housing; however, this is not required. A pipe or hose 258 conveys air from the compressor to the air accumulator tank as shown in FIG. 5. As illustrated in FIG. 2, electric motor 252 is electrically connected to receptacle 300 by a plug 260. Electric motor 252 can be alternatively or additionally powered by an external powered source via electric plug 260. The cord 272 of plug 260 is shown to extend through the top of housing 110. As can be appreciated, the cord can extend through the housing in other regions of the housing. As can also be appreciated, plug 260 and cord 272 can be stored in a compartment in the housing (not shown). The use of plug 260 allows a user to operate the air compressor without having to start and operate engine 180 of the engine welder. FIG. 2A illustrates an engine welder similar to FIGURE expect that plug 260 is only connected to the internal power source of the engine welder. As can be appreciated, the engine welder can be designed such that plug 260 is only connectable to an external power source.

The air compressor typically includes a pressure monitor 280 that is used to monitor the air pressure in one or more of the air accumulator tanks. A pressure gauge (not shown) can be positioned on the front panel of the housing to provide the user information as to the pressure level in the one or more of the air accumulator tanks. The air compressor also includes a pressure valve 290 that can be used to regulate the flow of air into and/or out of the one or more of the air accumulator tanks. As shown in FIG. 5, the pressure monitor can be designed to generate a signal that is used to control the operation of motor 252 and/or pressure valve 290. In one non-limiting design, the pressure monitor generates a signal to the contactor 282 to electrically disconnect the motor 252 when a certain pressure level is detected in the air accumulator tanks 256. Such an arrangement can facilitate in inhibiting or preventing over-pressurization of the air accumulator tanks 256. In another non-limiting design, the pressure monitor generates a signal contactor 282 to electrically connect to motor 252 when a certain pressure level is detected in the air accumulator tanks 256. Such an arrangement can facilitate in inhibiting or preventing under pressurization the air accumulator tanks 256 during the use of an air powered tool. FIG. 5 also illustrates that pressure valve 290 can send and/or receive a signal from contactor 282 and/or pressure monitor 280. In one non-limiting design, the pressure valve generates a signal to contactor 282 to electrically connect to motor 252 when the valve is opened. Such an arrangement can facilitate in inhibiting or preventing under pressurization the air accumulator tanks 256 during the use of an air powered tool. In another non-limiting design, the pressure valve receives a signal to and from contactor 282 and/or pressure monitor to cause the pressure valve to open. Such an arrangement can facilitate in inhibiting or preventing over-pressurization of the air accumulator tanks 256 when the pressure monitor detects a certain pressure level in the air accumulator tanks. As can be appreciated, many other or additional control systems can be used to maintain the desired pressure level in the air accumulator tanks.

Figure 4:
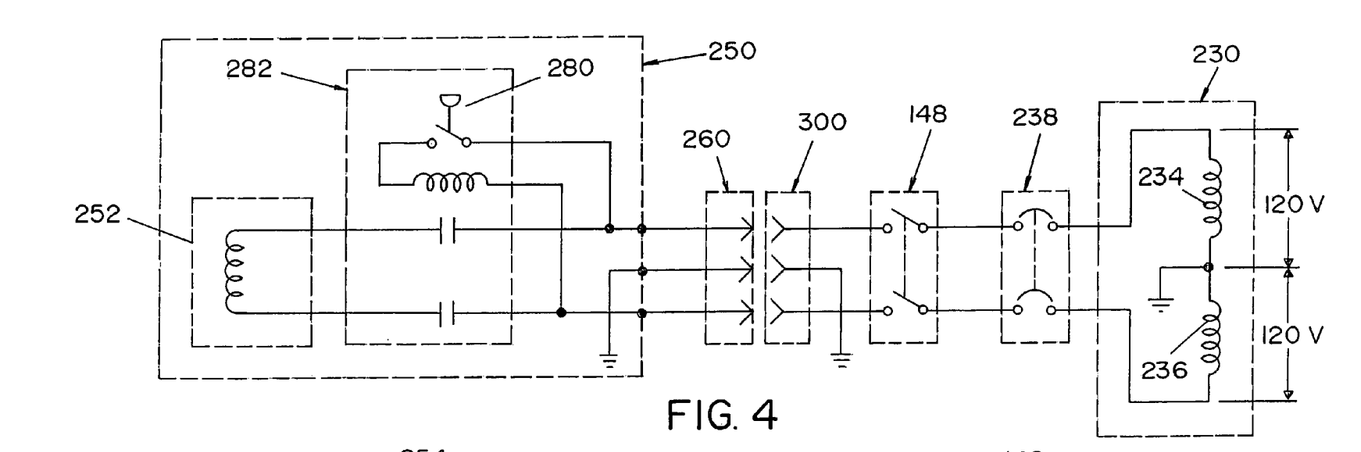
FIG. 4 is an electrical schematic of the relationship between the electric generator and the electric air compressor; and, FIG. 5 is a block diagram illustrating the air compressor system of the engine welder of FIG. 1.

One basic arrangement for the connection of the air compressor to the electric generator of the engine welder is illustrated in FIG. 4. The electric generator includes two windings 234,236 that can be used to generate a 120V or 240V output. The output from the electric generator is directed to a circuit breaker (e.g. two pole breaker). The circuit breaker 238 is connected to air compressor switch 148 that is located on the front panel of the housing. Although not shown in FIG. 4, plug 260, when used, is typically electrically connected between the electric generator and the air compressor switch. Referring again to FIG. 4, when the switch is turned on, the electric power from the electric generator is directed to receptacle 300. Plug 260 is connected to receptacle 300. The current flowing through plug 260 is used to energize motor 252 of air compressor 250. A pressure switch 280 is associated with compressor 254 and is used to activate or deactivate motor 252 to maintain the desired or acceptable amount of pressure in tanks 256.

It will be appreciated that the present invention provides a self-contained, portable and fully integrated unit 100 that can be easily and conveniently transported to various work sites for use in welding, providing auxiliary electric power, and/or providing compressed air. In addition, the housing of the internal combustion engine, electric alternator, and the air compressor results in a noise level reduction, thereby improving the work environment. Furthermore, the combined welder and air compressor in the housing facilitates in the quick and easy connection and removal of welding equipment, electrical equipment and/or air tools on the housing.

The invention has been described with reference to a preferred embodiment and alternatives thereof. It is believed that many modifications and alterations to the embodiments disclosed readily suggest themselves to those skilled in the art upon reading and understanding the detailed description of the invention. It is intended to include all such modifications and alterations insofar as they come within the scope of the present invention.

We claim:

1. An integrated welder, generator and compressor unit comprising:
   a. a housing;
   b. an engine at least partially positioned in said housing;
   c. an electric current generator at least partially positioned in said housing and at least partially connected or interconnected to said engine to be at least partially driven thereby;
   d. an electric powered air compressor at least partially mounted in said housing, said electric powered air compressor adapted to be at least partially powered by said electric current generator, at least partially powered by a power source external to said integrated welder, or combinations thereof; and,
   e. an electric circuit that controls distribution of power to said electric powered air compressor from said power source external to said integrated welder.

2. The unit as defined in claim 1, wherein said electric circuit includes a sensor to sense to one or more of available power sources that can provide electric current to said electric powered air compressor.

3. The unit as defined in claim 2, wherein said electric circuit automatically selects a source of electric current from said electric current generator, said power source external to said integrated welder power source, or combinations thereof to be provided to said electric powered air compressor.

4. The unit as defined in claim 1, including an electric plug that is detachably connectable to said power source external to said integrated welder power source.

5. The unit as defined in claim 4, wherein said housing includes a plug compartment that is accessible from an exterior surface of said housing, said plug compartment adapted to at least partially contain said electric plug.

6. The unit as defined in claim 4, wherein said electric plug is positioned on an exterior surface of said housing, positioned in a compartment that is accessible from the exterior surface of said housing, positioned on an electric cord that is positioned in a compartment that is accessible from the exterior surface of said housing, or positioned on an electric cord that is extending from the exterior surface of said housing.

7. The unit as defined in claim 1, including a receiver tank at least partially mounted in said housing, said receiver tank fluidly connected to said air compressor.

8. The unit as defined in claim 1, including a pressure monitor to monitor a pressure at least partially generated by said electric powered air compressor.

9. The unit as defined in claim 8, wherein said pressure monitor monitors a pressure in said receiver tank.

10. The unit as defined in claim 8, wherein said pressure monitor generates a control signal to at least partially control the activation, deactivation, or combinations thereof of said air compressor.

11. The unit as defined in claim 1, including a pressure valve, said pressure valve generating a control signal to at least partially control the activation, deactivation, or combinations thereof of said air compressor.

12. A method of providing compressed air from an integrated welder comprising:
   a. providing a housing that at least partially contains an engine at least partially mounted in said housing;
   b. providing an electric current generator that is at least partially mounted in said housing and is at least partially connected or interconnected to said engine to be at least partially driven thereby;
   c. providing an electric powered air compressor at least partially mounted in said housing, said electric powered air compressor adapted to be at least partially powered by said electric current generator, at least partially powered by a power source external to said integrated welder, or combinations thereof; and,
   d. providing an electric circuit that controls distribution of power to said electric powered air compressor from said power source external to said integrated welder.

13. The method as defined in claim 12, including the step of said electric circuit sensing to one or more of available power sources that can provide electric current to said electric powered air compressor.

14. The method as defined in claim 13, including the step of automatically selecting a source of electric current from said electric current generator, said power source external to said integrated welder power source, or combinations thereof to be provided to said electric powered air compressor.

15. The method as defined in claim 12, including the step of detachably connecting a plug to said power source external to said integrated welder power source so as to provide electric current to said electric powered air compressor.

16. The method as defined in claim 12, including the step of monitoring a pressure generated by said electric powered air compressor.

17. The method as defined in claim 16, including the step of generating a control signal based upon a detected pressure generated by said electric powered air compressor, said control signal at least partially controlling the activation, deactivation, or combinations thereof of said air compressor.

18. The method as defined in claim 12, including the step of providing a receiver tank at least partially mounted in said housing, said receiver tank fluidly connected to said air compressor.

19. The method as defined in claim 18, including the step of monitoring a pressure in said receiver tank.

20. The method as defined in claim 19, including the step of generating a control signal based upon a detected pressure in said receiver tank to at least partially control the activation, deactivation, or combinations thereof of said air compressor.

21. The method as defined in claim 12, including the step of providing a pressure valve adapted to release pressured fluid, said pressure valve generating a control signal to at least partially control the activation, deactivation, or combinations thereof of said air compressor.

* * * * *